Dec. 1, 1925.
W. E. McLAREN
1,563,766
VEHICLE
Original Filed April 16, 1924
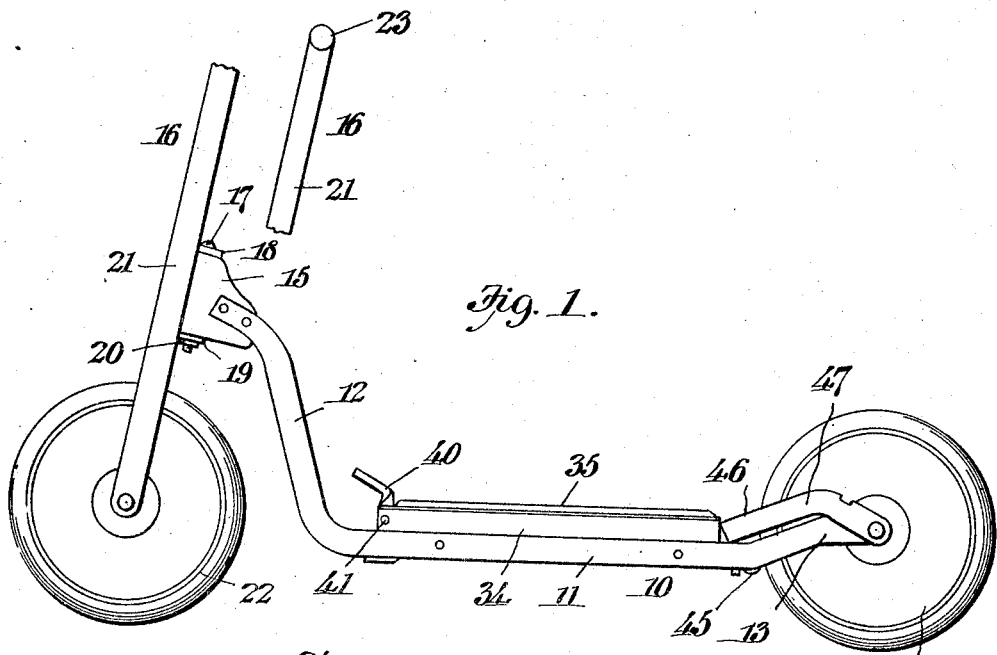
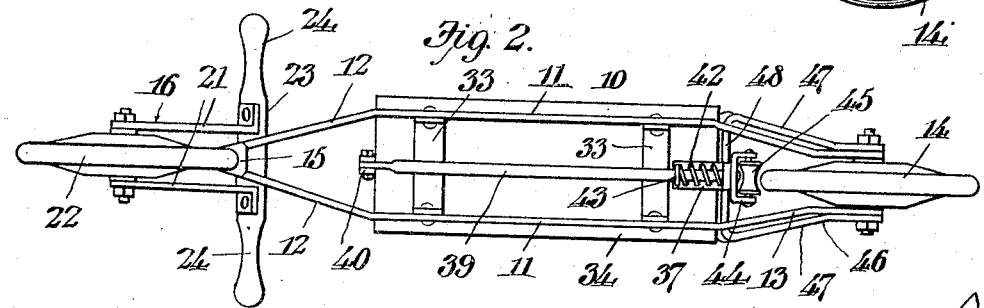
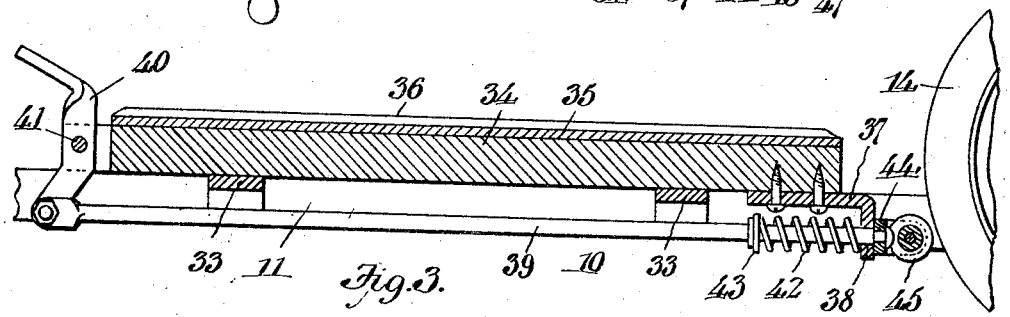
Inventor
William E. McLaren,
By *[signature]*
Attorney Patented Dec. 1, 1925.

1,563,766

UNITED STATES PATENT OFFICE.

WILLIAM E. McLAREN, OF LOS ANGELES, CALIFORNIA.

VEHICLE.

Original application filed April 16, 1924, Serial No. 706,820. Divided and this application filed March 12, 1925. Serial No. 14,977.

*To all whom it may concern:*

Be it known that I, WILLIAM E. MCLAREN, a citizen of the United States, residing at Los Angeles, county of Los Angeles, State of California, have invented certain new and useful Improvements in Vehicles, of which the following is a specification.

This invention relates, generally, to improvements in vehicles, but has particular relation to that type of wheeled vehicles for use by children, commonly known as "scooters", wherein propulsion thereof is effected by placing one foot of the user on the foot rest board of the vehicle and by thrusts in the proper direction on the ground of the other foot.

One of the objects of the invention is the provision in a wheeled vehicle, of braking means therefor, of such construction, arrangement and co-operation of its parts with parts of the vehicle, that said means may be applied by foot manipulation and in such a manner as to render abrupt stoppage of the vehicle impossible, thereby avoiding the possibility of the child or user being thrown violently forward and possibly from the vehicle and injured, yet so that a gradual but positive stopping or braking action will be attained.

It is another object of the invention to furnish simple and efficient means for preventing the foot of the user applied to the foot rest board of one form of the invention slipping in the operation of propelling the vehicle.

This application is a division of application Ser. No. 706,820, filed by me on April 16, 1924, Patent No. 1,529,957.

Other objects and advantages of the invention will become apparent from the following description and explanation, which will be more readily understood when read in conjunction with the accompanying drawings, which serve to illustrate embodiments of the invention, it being understood that modifications and changes may be resorted to without a departure from the spirit of the invention as expressed in the appended claims forming a part hereof.

In the drawings:

Fig. 1 is a view in side elevation of a "scooter" constructed in accordance with the invention.

Fig. 2 is a bottom plan view of the vehicle shown in Fig. 1, and

Fig. 3 is a longitudinal section through the foot rest board showing a portion of the frame of the vehicle and the brake mechanism for co-operation with the rear wheel of the vehicle.

Referring now more particularly to the drawings, the reference numeral 10 designates as a whole the frame of the vehicle, which comprises a pair of spaced parallel bars 11 which have their front portions upturned and approximated or inclined towards each other as at 12 and their rear portions slightly upturned or rearwardly inclined as at 13. The rear wheel 14 of the vehicle is suitably journaled between the rear ends of the members 11 of the frame and said wheel is by preference equipped with a rubber tire of any desired kind.

The front ends of the bars 11 of the main frame of the vehicle are secured to a head 15, which head is pivotally connected to the upright steering member designated as a whole by the numeral 16 by mean of a pivot rod 17 extended through openings in rearwardly extended projections 18 and 19 on the steering member 16 and through a suitable opening in the head 15, which rod can be held in position by means of a nut 20 threaded on its lower portion. The steering member 16 may include parallel bars 21 which are spaced and have their lower portions downwardly and outwardly deflected, so as to stride the front wheel 22 of the vehicle and so as to embrace its hub portion which is suitably journaled in the lower ends of the bars 21 constituting the steering member of the vehicle. The wheel 22, like the wheel 14, is by preference provided with a rubber tire. The upper ends of the bars 21 have transversely mounted thereon in any suitable way a handle 23 provided with a gripping portion 24 near each of its ends.

Mounted on the upper surface of the parallel portions of the frame 10 and their brace bars 33 which connect them together transversely, is the foot rest board 34 which is provided on its surface with a mat or covering 35 which is by preference made of rubber or some other suitable slightly resilient material and has a series of spaced longitudinally extending ribs 36 on its upper surface. This mat or covering 35 is by preference co-extensive in its dimensions with that of the board 34 and is employed for preventing or rendering less liable slipping of the foot of the user of the vehicle which rests on said mat when riding or propelling the vehicle. At its rear end and about midway between the bars 11 the board 34 has secured to its lower surface a depending bracket 37 which has an opening 38 for the reception and operation of a brake rod 39 located at one of its ends in said opening and extended horizontally and longitudinally beneath the board 34. This rod has its front end pivotally connected to a foot lever 40 which is somewhat of the form of a bell crank lever and is fulcrumed between its ends on a pivot 41 mounted in the front end of the foot rest board about midway between the front portion of the parallel parts 11 of the main frame of the vehicle. The foot lever 40 extends above the board 34 and its mat 35 and is held in its normal position as shown in Figs. 2 and 3 by means of a coil spring 42 located around the rod 39 at its rear portion and has one of its ends in contact with the depending bracket 37 and its other end resting against a collar 43 fixed to the rod 39 at a suitable distance forwardly of said bracket.

Mounted on the rear end of the rod 39 is a shoe adapted to engage with the rear wheel of the vehicle for controlling the speed thereof. This shoe preferably comprises a U-shaped yoke 44 between the arms of which is rotatably located a spool-shaped brake shoe 45 to contact with the wheel 14 when desired. In order to cause the brake shoe 45 to contact with the rear wheel 14, it is obvious that by applying pressure to the foot lever 40 and forcing the upper end of said lever forwardly, the rod 39 will be moved longitudinally and rearwardly against the tension of the spring 43 a sufficient distance to permit the roller 45 to impinge against the tire of the wheel 14 and as both of these members revolve, it is obvious that abrupt stoppage of the vehicle will be prevented but a gradual and positive stoppage will be effected.

In order to provide means for holding the vehicle in an upright position while the same is at rest, I employ a stirrup or loop member generally designated 46, having its ends pivotally connected to the shaft or axle of the rear wheel 14 and being of sufficient size to straddle the said wheel without touching the same. As shown, the stirrup 46 has its side members 47 inclined from each other forwardly and connected together at their front portions by a cross-piece 48, which, when the member 46 is turned down, the cross-piece 48 will rest on the ground or floor forwardly of the axis of the wheel 14, thus forming a wide base for supporting said wheel out of contact with the floor and against lateral or tilting movement.

From the foregoing and by reference to the drawings it will be readily understood and clearly seen that by my improvements a very simple, inexpensive and efficient vehicle of the class described is provided, in which the user may apply braking pressure to the rear wheel thereof in such a way that the abrupt stoppage of the vehicle will be avoided, yet a gradual stoppage thereof will be effected.

It is further obvious that a means for supporting a vehicle of the scooter type in an upright position is afforded, which means is simple in operation yet very effective.

Having thus described my invention, I claim:

1. In a scooter vehicle, a foot board, front and rear wheels supporting said board, a bracket at the rear of said board, a rod slidable in said bracket, a yoke at the rear end of said rod, a roller in said yoke adapted when the rod is moved rearwardly to engage said wheel, a pedal at the front of said board connected to said rod, and a spring associated with said rod and bracket and normally holding said rod retracted.

2. In a scooter vehicle, a foot board, front and rear wheels supporting said board, a bracket at the rear of said board having an apertured portion depending therefrom and alined with said rear wheel, a rod slidable in said apertured portion and disposed substantially parallel with said board, a brake member at the rear of said rod beyond said bracket and adapted to engage said rear wheel when the rod is moved in one direction, a spring normally holding the rod with said brake retracted, and a pedal pivoted near the forward end of said board and attached to said rod.

3. In a scooter vehicle, a foot board, a pair of parallel bars beneath and supporting said board, front and rear wheels supporting said bars, a bracket depending from the rear of said board, a rod slidable in said bracket and disposed beneath said board in a plane above the lower edges of said bars, a brake at the rear of said rod for engagement with said rear wheel, and a pedal connected with the front portion of said rod.

In testimony whereof I affix my signature.

WILLIAM E. McLAREN.